US012723426B2

(12) United States Patent
Garduño Estebanez et al.

(10) Patent No.: US 12,723,426 B2
(45) Date of Patent: Sep. 1, 2026

(54) POST-TENSIONING SYSTEM FOR A TOWER OF A WIND TURBINE, POST-TENSIONED TOWER OF A WIND TURBINE AND METHOD OF POST-TENSIONING A TOWER OF A WIND TURBINE

(71) Applicant: NORDEX ENERGY SPAIN, S.A.U., Navarra (ES)

(72) Inventors: Aitor Garduño Estebanez, Navarra (ES); Teresa Arlabán Gabeiras, Navarra (ES); Miguel Núñez Polo, Navarra (ES)

(73) Assignee: NORDEX ENERGY SPAIN, S.A.U., Navarra (ES)

( * ) Notice: Subject to any disclaimer, the term of this patent is extended or adjusted under 35 U.S.C. 154(b) by 144 days.

(21) Appl. No.: 18/724,050

(22) PCT Filed: Dec. 1, 2022

(86) PCT No.: PCT/EP2022/084108
§ 371 (c)(1),
(2) Date: Jun. 25, 2024

(87) PCT Pub. No.: WO2023/126123
PCT Pub. Date: Jul. 6, 2023

(65) Prior Publication Data

US 2025/0052085 A1 Feb. 13, 2025

(30) Foreign Application Priority Data

Dec. 29, 2021 (EP) .................................... 21383234

(51) Int. Cl.
*E04H 12/16* (2006.01)
*E04H 12/12* (2006.01)
*F03D 13/20* (2016.01)

(52) U.S. Cl.
CPC ............. *E04H 12/16* (2013.01); *E04H 12/12* (2013.01); *F03D 13/201* (2023.08); *F05B 2240/912* (2013.01)

(58) Field of Classification Search
CPC ... E04H 12/16; F03D 13/201; F05B 2240/912
See application file for complete search history.

(56) References Cited

U.S. PATENT DOCUMENTS

2016/0032608 A1 2/2016 Betran Palomas
2016/0305405 A1 10/2016 Kraft
2016/0312431 A1 10/2016 Coordes

*Primary Examiner* — Patrick J Maestri
(74) *Attorney, Agent, or Firm* — Hayes Soloway PC

(57) ABSTRACT

The present invention relates to a post-tensioning system for a tower of a wind turbine that manages the quasi-permanent loads on the tower to counter them, reducing their impact and making it possible to decrease the required amount of overall post-tension force in the tower of the wind turbine, also to a post-tensioned tower of a wind turbine comprising the post-tensioning system and to the method of post-tensioning a tower of a wind turbine.

13 Claims, 5 Drawing Sheets

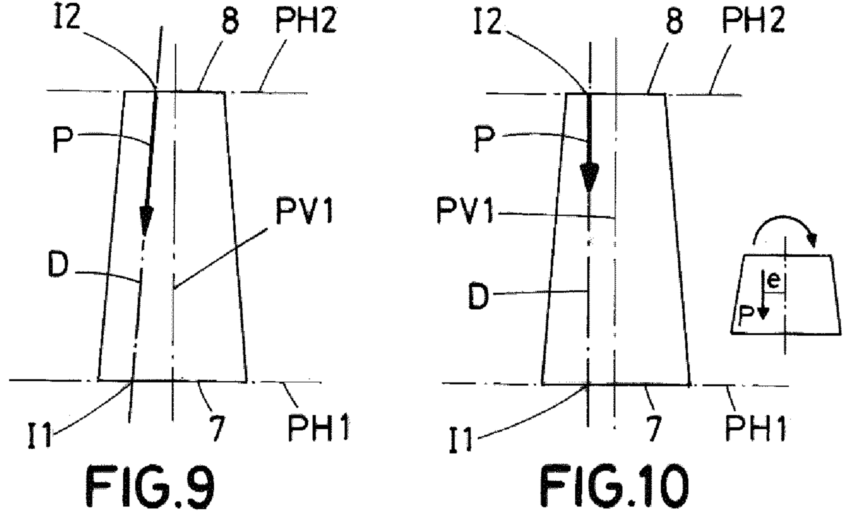
FIG.9
FIG.10
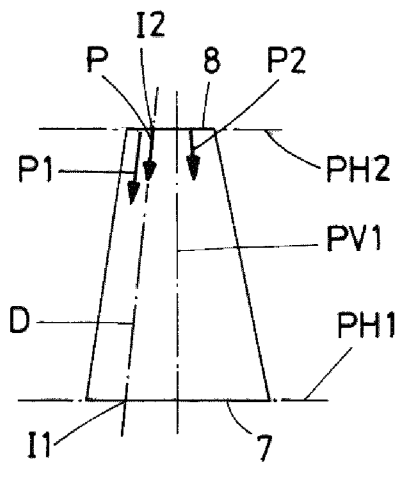
FIG.11

POST-TENSIONING SYSTEM FOR A TOWER OF A WIND TURBINE, POST-TENSIONED TOWER OF A WIND TURBINE AND METHOD OF POST-TENSIONING A TOWER OF A WIND TURBINE

CROSS-REFERENCE TO RELATED APPLICATIONS AND PRIORITY

This patent application claims priority from PCT Application No. PCT/EP2022/084108 filed Dec. 1, 2022, which claims priority from European Patent Application No. 21383234.8 filed Dec. 29, 2024.

OBJECT OF THE INVENTION

The present invention relates to a post-tensioning system for a tower of a wind turbine that manages the quasi-permanent loads on the tower to counter them, reducing their impact and making it possible to decrease the required amount of overall post-tension force in the tower of the wind turbine.

The invention also relates to a post-tensioned tower of a wind turbine comprising the post-tensioning system.

Also, the invention relates to a method of post-tensioning a tower of a wind turbine.

BACKGROUND OF THE INVENTION

Concrete towers of wind turbines, and concrete parts of hybrid towers, preferably made of steel and concrete, are commonly provided with a post-tension system (e.g., cables, tendons, wires, strands . . . ) in order to ensure that the concrete is under compression stresses during the most of the wind turbine lifetime. That is, in order to avoid undesirable tension stresses in the structure that would lead to excessive cracks in concrete and fatigue in reinforcements.

Commonly, the post-tensioning elements (e.g., tendons) are uniformly distributed along the tower perimeter, so that the resultant post-tension force falls approximately in the central axis of the tower, avoiding in this way eccentric forces due to the post-tension system.

Wind industry standards and guidelines usually require a minimum amount of post-tension so that no decompression occurs in concrete under Quasi-permanent load level. This load level (also known as D3 or S3 load level, depending on the guideline) is the one that is only exceeded during 1% of the wind turbine lifetime. That is, by applying the minimum post-tension force required by guidelines, it is ensured that the structure will be subjected only to compressive stresses during the 99% of the wind turbine lifetime.

However, due to the fact that the wind does not actually blow with the same intensity in every direction, the load level related to a probability of exceedance of 1% is not the same in every direction, resulting in asymmetrical loads on the concrete tower or a concrete part of a hybrid tower. This can lead to collapse of the tower in case of extreme winds.

The post-tensioning system for a tower of a wind turbine of the present invention solves all the above-mentioned drawbacks.

DESCRIPTION OF THE INVENTION

The present invention relates to a post-tensioning system for a tower of a wind turbine that manages the quasi-permanent loads on the tower to counter them, reducing their impact and making it possible to decrease the required amount of overall post-tension force in the tower of the wind turbine, due to the fact that the bending moment of the so called Quasi-permanent load (Map) can be much higher in the predominant wind direction than in other directions (in perpendicular direction, in the opposite direction . . . ), the load level related to a probability of exceedance of 1% is not the same in every direction.

The post-tensioning system for a tower of a wind turbine, wherein the tower comprises at least:

- a vertical axis;
- a concrete tower part comprising:
  - an upwind side and a downwind side, wherein the upwind side and the downwind side are defined, in use, from a first vertical plane containing the vertical axis and being perpendicular to a predominant wind direction, upwards and downwards respectively, from the first vertical plane; and the system comprising:

- an upper end comprising a first surface and a lower end comprising a second surface;
- a plurality of tensioning elements, wherein each one of the tensioning elements comprises a first end located in the upper end and a second end located in the lower end;
- a first set of anchoring elements configured to anchor the first ends of the tensioning elements towards the first surface;
- a second set of anchoring elements configured to anchor the second ends of the tensioning elements towards the second surface;
- wherein the tensioning elements are configured to exert a resultant post-tension force comprising a line of action which intersects with a horizontal plane located at the lower end in a first intersection point upwards from the first vertical plane.

The line of action of a force is the geometric representation of how the force is applied, i.e., the line through the point at which the force is applied in the same direction as the vector of the force.

In this way, at least the horizontal component of the resultant post-tension force caused by the tensioning elements so configured causes a bending moment countering the bending moment of the so-called Quasi-permanent load ($M_{qp}$) in the predominant wind direction.

The resultant post-tension force also makes possible to reduce the amount and/or quality of the concrete of the concrete tower part.

Additionally, since fatigue load cycles act mainly in the predominant wind direction, the resultant post-tensioning force helps to counter their impact as well, reducing fatigue damage in structure.

The bending moment caused by the resultant post-tension force must be added to extreme loads when calculating ultimate state verifications, since extreme loads can act in any direction.

Each tensioning element comprises a set of strands.

Optionally, the first ends and the second ends of the tensioning elements are disposed in a symmetrical way with respect to the first vertical plane. Preferably, the number of strands of the tensioning elements disposed upwards from the first vertical plane is greater than the number of strands of the tensioning elements disposed downwards from the first vertical plane.

Also preferably, a first post-tensioning force that exerts, in use, the tensioning elements disposed upwards from the first vertical plane is greater than a second post-tensioning force that exerts, in use, the tensioning elements disposed downwards from the first vertical plane.

Optionally, the first ends of the tensioning elements are disposed in a symmetrical way with respect to the first vertical plane, while the second ends of the tensioning elements are disposed in a non-symmetrical way with respect to the first vertical plane. Preferably, the number of second ends of the tensioning elements disposed upwards from the first vertical plane is greater than the number of second ends of the tensioning elements disposed downwards from the first vertical plane.

Optionally, the resultant post-tension force is contained in a second vertical plane perpendicular to the first vertical plane, the second vertical plane containing the predominant wind direction.

Optionally, the resultant post-tension force also intersects with an additional horizontal plane located at the upper end in a second intersection point. Preferably, the first intersection point and the second intersection point are located at the same distance from the first vertical plane. Also preferably, the first intersection point and the second intersection point are located at a different distance from the first vertical plane.

Optionally, the tensioning elements are distributed homogeneously along a circumference of the tower.

Optionally, the tensioning elements are distributed heterogeneously along a circumference of the tower.

Optionally, the first surface of the upper end is located in an adaptor of the tower, preferably a steel adaptor or a concrete adaptor of a better quality than the concrete of the concrete tower part of the tower, being the upper end of the post-tensioning system of the invention the adaptor.

Optionally, the second surface of the lower end is located in a tower foundation of the tower, being the lower end of the post-tensioning system of the invention the tower foundation.

Optionally, the first surface of the upper end and/or the second surface of the lower end are located in a surface of the concrete tower part of the tower, being the upper end of the post-tensioning system of the invention an upper part of the concrete tower part and the lower end of the post-tensioning system of the invention a lower part of the concrete tower part.

Optionally, the first surface of the upper end is located in a steel tower bottom flange of a steel tower part disposed above the concrete tower part of the tower, being the upper end of the post-tensioning system of the invention the steel tower part disposed above the concrete tower part of the tower.

The invention also relates to a post-tensioned tower of a wind turbine comprising the post-tensioning system for a tower of a wind turbine. Also, the invention relates to a wind turbine comprising the post-tensioned tower.

Also, the invention relates to a method of post-tensioning a tower of a wind turbine, wherein the tower comprises at least:

- a vertical axis;
- a concrete tower part comprising:
  - an upwind side and a downwind side, wherein the upwind side and the downwind side are defined, in use, from a first vertical plane containing the vertical axis and being perpendicular to a predominant wind direction, upwards and downwards respectively, from the first vertical plane; and
- the method carried out with the post-tensioning system described above and comprising:
- a step of disposing in the concrete tower part a plurality of tensioning elements, wherein each one of the tensioning elements comprises a first end located in the upper end and a second end located in the lower end;
- a step of anchoring a first set of anchoring elements in the first ends of the tensioning elements towards the first surface;
- a step of anchoring a second set of anchoring elements in the second ends of the tensioning elements towards the second surface; and
- a step of exerting a resultant post-tension force comprising a line of action which intersects with a horizontal plane located at the lower end in a first intersection point upwards from the first vertical plane, by means of the tensioning elements.

Optionally, the step of disposing in the concrete tower part a plurality of tensioning elements comprises a step of disposing the first ends and the second ends of the tensioning elements in a symmetrical way with respect to the first vertical plane.

Optionally, the step of disposing in the concrete tower part a plurality of tensioning elements comprises a step of disposing a greater number of strands of the tensioning elements disposed upwards from the first vertical plane than the number of strands of the tensioning elements disposed downwards from the first vertical plane.

Optionally, the step of disposing in the concrete tower part a plurality of tensioning elements comprises a step of disposing at least one tensioning element with fewer strands in the downwind side than in the upwind side.

Optionally, the step of exerting a resultant post-tension force comprises a step of exerting a first post-tensioning force by means of the tensioning elements disposed upwards from the first vertical plane and exerting a second post-tensioning force by means of the tensioning elements disposed downwards from the first vertical plane, wherein the first post-tensioned force is greater than the second post-tensioned force.

Optionally, the step of disposing in the concrete tower part a plurality of tensioning elements comprises disposing the first ends of the tensioning elements in a symmetrical way with respect to the first vertical plane, and disposing the second ends of the tensioning elements in a non-symmetrical way with respect to the first vertical plane. Preferably, the step of disposing in the concrete tower part a plurality of tensioning elements comprises disposing a greater number of second ends of the tensioning elements upwards from the first vertical plane than the number of second ends of the tensioning elements disposed downwards from the first vertical plane.

Optionally, the step of exerting a resultant post-tension force is carried out exerting the resultant post-tension force in a line of action contained in a second vertical plane perpendicular to the first vertical plane, the second vertical plane containing the predominant wind direction.

Optionally, the step of exerting a resultant post-tension force is carried out exerting the resultant post-tension force in a line of action which also intersects with an additional horizontal plane located at the upper end in a second intersection point. Preferably, the step of exerting a resultant post-tension force is carried out exerting the resultant post-tension force in a line of action such that the first intersection point and the second intersection point are located at the same distance from the first vertical plane. Also preferably, the step of exerting a resultant post-tension force is carried out exerting the resultant post-tension force in a line of action such that the first intersection point and the second intersection point are located at a different distance from the first vertical plane.

Optionally, the step of exerting a resultant post-tension force is carried out exerting the resultant post-tension force in a line of action such that the first intersection point and/or the second intersection point are located at a distance between 0.1 m and 3 m from the first vertical plane.

BRIEF DESCRIPTION OF THE DRAWINGS

FIG. 9 shows the resultant post-tension force exerted by the tensioning elements in another embodiment of the system of the invention, wherein the line of action of the resultant post-tension force intersects the additional horizontal plane located at the upper end in a second intersection point displaced from the vertical axis of the tower.

FIG. 10 shows the resultant post-tension force exerted by the tensioning elements in another embodiment of the system of the invention, wherein the line of action of the resultant post-tension force is parallel to the vertical axis of the tower.

FIG. 11 shows a lateral view of the concrete tower part shown in FIG. 2, wherein a third embodiment of the post-tensioning system of the present invention is represented, being P1 greater than P2.

PREFERRED EMBODIMENT OF THE INVENTION

Figure 1:
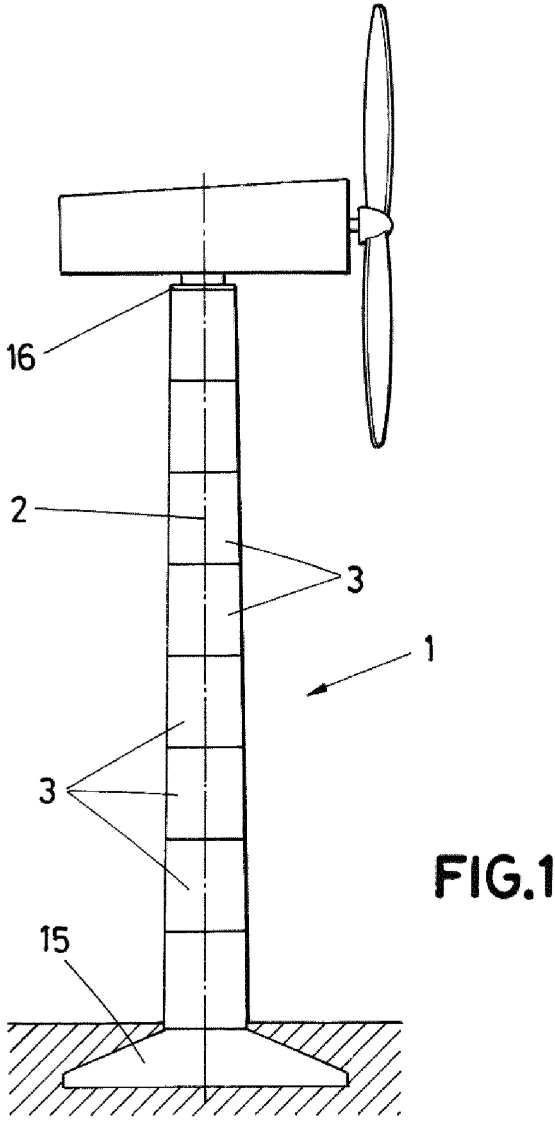
FIG. 1 shows a lateral view of a wind turbine with different constituent parts of the tower wherein the post-tensioning system of the present invention is disposed, according to the invention.
Figures 5, 6, 7, 8:
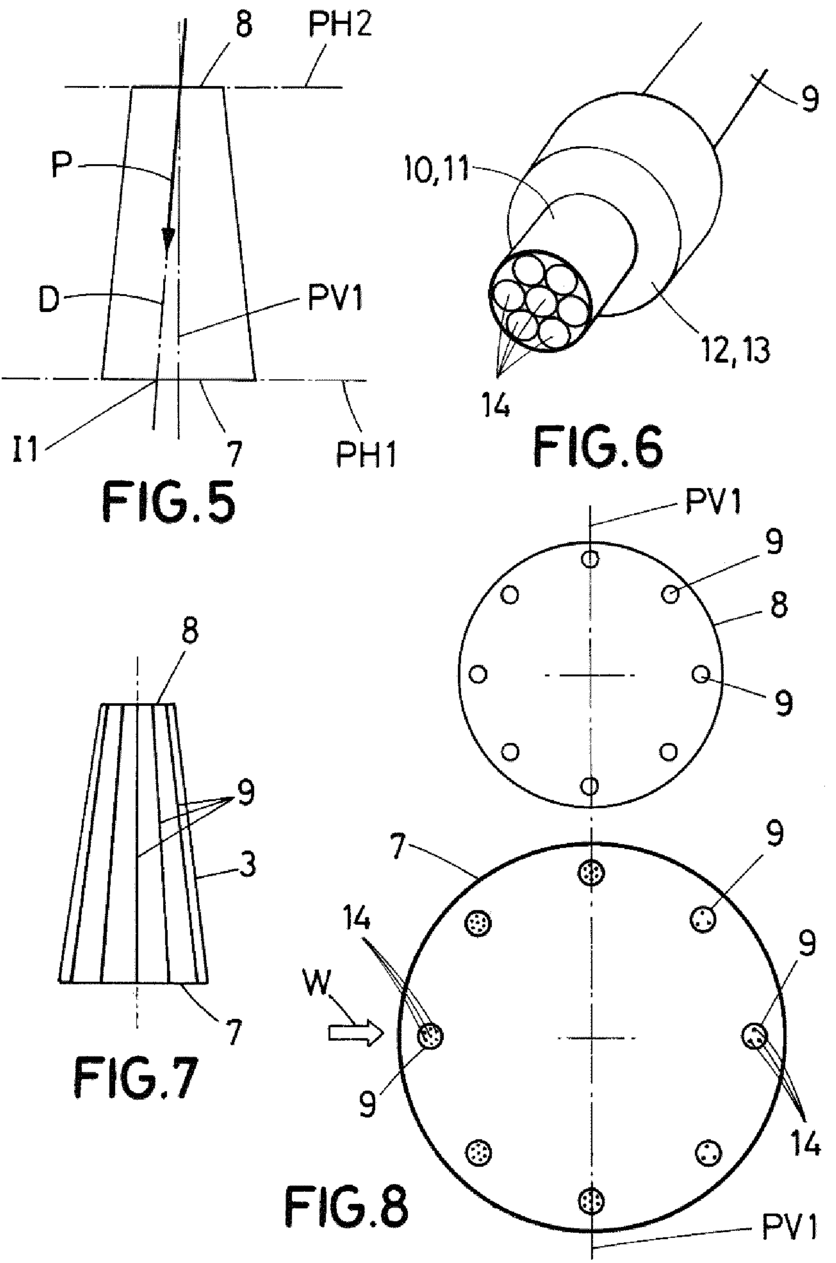
FIG. 5 shows the resultant post-tension force exerted by the tensioning elements of the system of FIG. 3.
FIG. 6 shows a detail of the anchoring elements of the tensioning elements, wherein each tensioning element comprises several strands.
FIG. 7 shows a lateral view of the concrete tower part shown in FIG. 2, wherein a second embodiment of the post-tensioning system of the present invention is represented.
FIG. 8 shows in the upper part, the upper end of the concrete tower part shown in FIG. 7 and in the lower part, the lower end of the concrete tower part shown in FIG. 7, showing how the tensioning elements disposed upwards from the first vertical plane comprises a greater number of strands than the number of strands of the tensioning elements disposed downwards from the first vertical plane (only represented in the lower end).

The invention is described in detail as follows. It relates to a post-tensioning system for a tower of a wind turbine, wherein the tower (1) comprises at least:

- a vertical axis (2);
- a concrete tower part (3) comprising:
  - an upwind side (4) and a downwind side (5), wherein the upwind side (4) and the downwind side (5) are defined, in use, from a first vertical plane (PV1) containing the vertical axis (2) and being perpendicular to a predominant wind direction (W), upwards and downwards respectively, from the first vertical plane (PV1); and the system comprising:

- an upper end (18) comprising a first surface (8) and a lower end (17) comprising a second surface (7);
- a plurality of tensioning elements (9), wherein each one of the tensioning elements (9) comprises a first end (10) located in the upper end (18) and a second end (11) located in the lower end (17);
- a first set of anchoring elements (12) configured to anchor the first ends (10) of the tensioning elements (9) towards the first surface (8);
- a second set of anchoring elements (13) configured to anchor the second ends (11) of the tensioning elements (9) towards the second surface (7);

As can be seen in FIG. 5, the tensioning elements (9) are configured to exert a resultant post-tension force (P) comprising a line of action (D) which intersects with a horizontal plane (PH1) located at the lower end (17) in a first intersection point (I1) upwards from the first vertical plane (PV1), (contained in a space defined within the upwind side).

Figure 12:
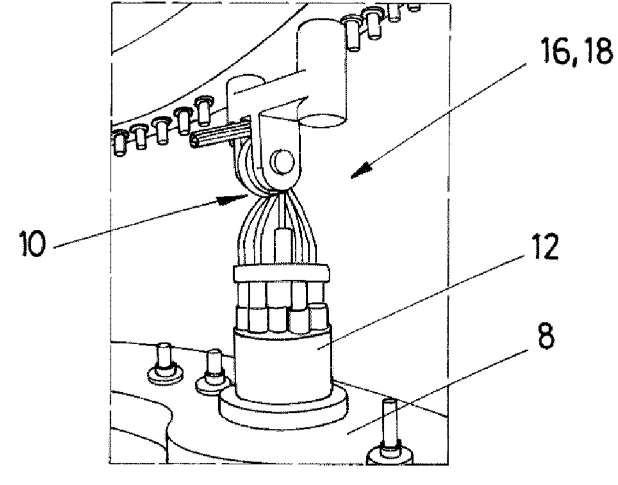
FIG. 12 shows the step of anchoring one anchoring element of the first set of anchoring elements in the first end of a tensioning element, wherein the tensioning element comprises several strands.

Preferably, the first surface (8) of the upper end (18) is located in an adaptor (16) of the tower (1), as shown in FIG. 12, being the upper end (18) of the post-tensioning system of the invention the adaptor.

Figure 13:
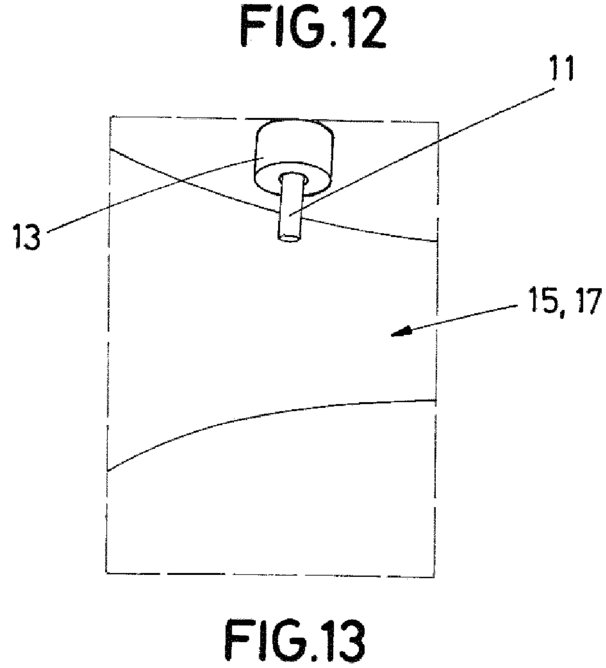
FIG. 13 shows the step of anchoring one anchoring element of the second set of anchoring elements in the second end of the tensioning element, wherein the tensioning element comprises several strands (not shown).

Preferably, the second surface (7) of the lower end (17) is located in a tower foundation (15) of the tower (1), as shown in FIG. 13, being the lower end (17) of the post-tensioning system of the invention the tower foundation.

Preferably, as shown in FIGS. 3, 5, 7, 9, 10 and 11, the first surface (8) of the upper end (18) and/or the second surface (7) of the lower end (17) are located in a surface of the concrete tower part (3) of the tower, being the upper end (18) of the post-tensioning system of the invention an upper part of the concrete tower part (3) and the lower end (17) of the post-tensioning system of the invention a lower part of the concrete tower part (3).

Figures 2, 3, 4:
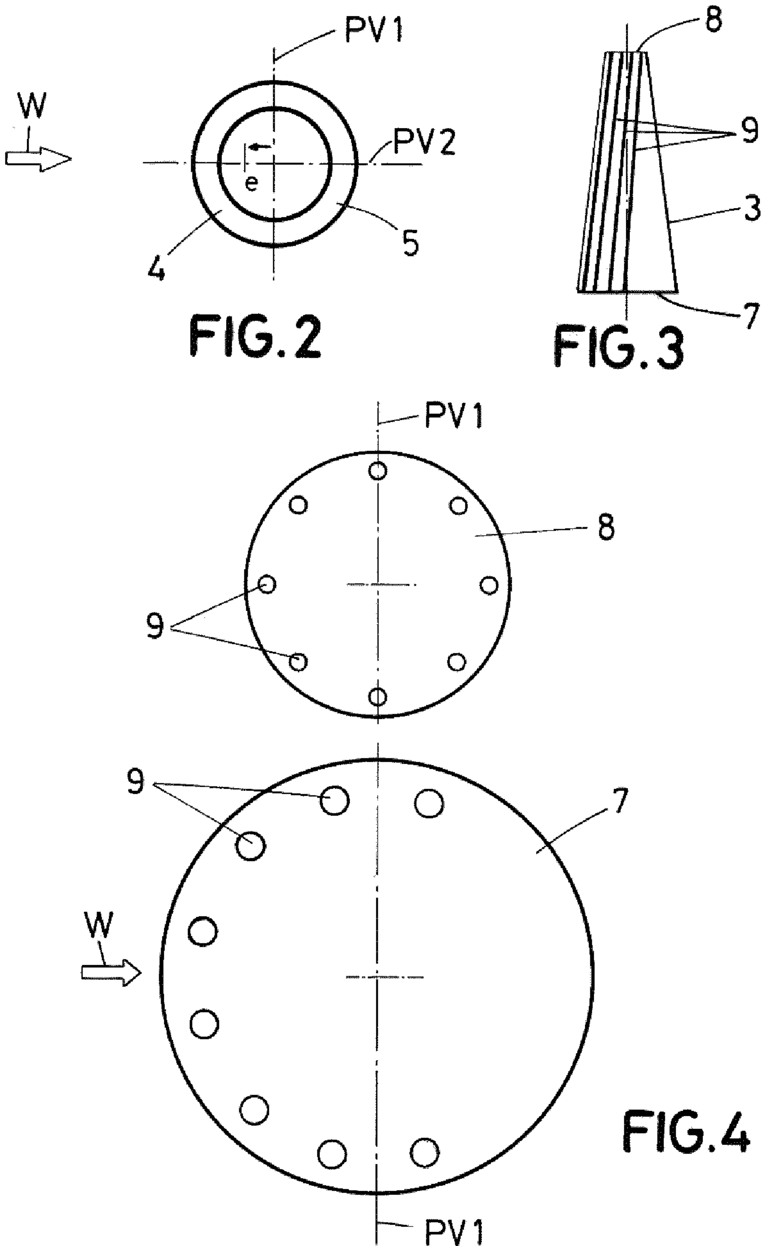
FIG. 2 shows a top view of the concrete tower part of the tower of a wind turbine wherein the post-tensioning system of the present invention is disposed.
FIG. 3 shows a lateral view of the concrete tower part shown in FIG. 2, wherein a first embodiment of the post-tensioning system of the present invention is represented.
FIG. 4 shows in the upper part, the upper end of the concrete tower part shown in FIG. 3 and in the lower part, the lower end of the concrete tower part shown in FIG. 3.

In the preferred embodiment shown in FIGS. 3 and 4, the resultant post-tension force (P) comprises a line of action (D) which intersects with the horizontal plane (PH1) located at the lower end (17) in a first intersection point (I1) upwards from the first vertical plane (PV1), as can be seen in FIG. 5, wherein the number of strands (14) forming each tensioning element (9) is the same, and the first ends (10) of the tensioning elements (9) are disposed in a symmetrical way with respect to the first vertical plane (PV1) and to a second vertical plane (PV2) perpendicular to the first vertical plane (PV1), the second vertical plane (PV2) containing the predominant wind direction (W). Preferably, the second ends (11) of the tensioning elements (9) are disposed in an asymmetrical way with respect to the first vertical plane (PV1) and in a symmetrical way with respect to the second vertical plane (PV2).

In another embodiment, the first ends (10) and/or the second ends (11) of the tensioning elements (9) are disposed in a symmetrical way with respect to the first vertical plane (PV1).

As can be seen in FIG. 6, each tensioning element (9) comprises a set of strands (14).

In another embodiment shown in FIG. 8, the number of strands (14) of the tensioning elements (9) disposed upwards from the first vertical plane (PV1) is greater than the number of strands (14) of the tensioning elements (9) disposed downwards from the first vertical plane (PV1) despite comprising the same number of tensioning elements (9) upwards than downwards from the first vertical plane (PV1).

In another embodiment, a first post-tensioning force (P1) that exerts, in use, the tensioning elements (9) disposed upwards from the first vertical plane (PV1) is greater than a second post-tensioning force (P2) that exerts, in use, the tensioning elements (9) disposed downwards from the first vertical plane (PV1).

In the embodiment shown in FIG. 4, the first ends (10) of the tensioning elements (9) are disposed in a symmetrical way with respect to the first vertical plane (PV1), while the second ends (11) of the tensioning elements (9) are disposed in a non-symmetrical way with respect to the first vertical plane (PV1). As can be seen in FIG. 4, the number of second ends (11) of the tensioning elements (9) disposed upwards from the first vertical plane (PV1) may be greater than the number of second ends (11) of the tensioning elements (9) disposed downwards from the first vertical plane (PV1). In the embodiment shown in FIG. 4, the first ends (10) and the second ends (11) of the tensioning elements (9) are disposed in a symmetrical way with respect to the second vertical plane (PV2).

In another embodiment shown in FIGS. 9 and 10, the resultant post-tension force (P) also intersects with an additional horizontal plane (PH2) located at the upper end (18) in a second intersection point (I2). Preferably, as shown in FIG. 9, the first intersection point (I1) and the second intersection point (I2) are located at a different distance from the first vertical plane (PV1). Also preferably, as shown in FIG. 10, the first intersection point (I1) and the second intersection point (I2) are located at the same distance from the first vertical plane (PV1). In this embodiment, the same asymmetrical distribution in the upper end (18) and in the lower end (17) of the first ends (10) and the second ends (11), respectively, of the tensioning elements (9), as well as the tensioning elements (9) being disposed parallel to the vertical axis (2) of the tower (1), is given.

Preferably, the first intersection point (I1) and/or the second intersection point (I2) are located at a distance between 0.1 m and 3 m from the first vertical plane (PV1).

Preferably, the first set of anchoring elements (12) and/or the second set of anchoring elements (13) are nuts, bolts or a combination of them.

The invention also relates to a post-tensioned tower of a wind turbine (1) comprising the post-tensioning system for a tower of a wind turbine. Also, the invention relates to a wind turbine (1) comprising the post-tensioned tower.

Also, the invention relates to a method of post-tensioning a tower of a wind turbine, wherein the tower comprises at least:

- a vertical axis (2);
- a concrete tower part (3) comprising:
  - an upwind side (4) and a downwind side (5), wherein the upwind side (4) and the downwind side (5) are defined, in use, from a first vertical plane (PV1) containing the vertical axis (2) and being perpendicular to a predominant wind direction (W), upwards and downwards respectively, from the first vertical plane (PV1); and
- the method carried out with the post-tensioning system described above and comprising:
  - a step of disposing in the concrete tower part (3) a plurality of tensioning elements (9), wherein each one of the tensioning elements (9) comprises a first end (10) located in the upper end (18) and a second end (11) located in the lower end (17);
  - a step of anchoring a first set of anchoring elements (12) in the first ends (10) of the tensioning elements (9) towards the first surface (8), as shown in FIG. 12;
  - a step of anchoring a second set of anchoring elements (13) in the second ends (11) of the tensioning elements (9) towards the second surface (7), as shown in FIG. 13; and
  - a step of exerting a resultant post-tension force (P) comprising a line of action (D) which intersects with a horizontal plane (PH1) located at the lower end (17) in a first intersection point (I1) upwards from the first vertical plane (PV1), by means of the tensioning elements (9).

In the embodiment shown in FIG. 4, the step of disposing in the concrete tower part (3) a plurality of tensioning elements (9) comprises disposing the first ends (10) in a symmetrical way with respect to the first vertical plane (PV1), and the second ends (11) of the tensioning elements (9) in a non-symmetrical way with respect to the first vertical plane (PV1). Preferably, the step of disposing in the concrete tower part (3) a plurality of tensioning elements (9) comprises disposing the first ends (10) in a symmetrical way with respect to the second vertical plane (PV2), and the second ends (11) of the tensioning elements (9) in a symmetrical way with respect to the second vertical plane (PV2).

In the embodiment shown in FIG. 8, the step of disposing in the concrete tower part (3) a plurality of tensioning elements (9) comprises disposing the first ends (10) and the second ends (11) of the tensioning elements (9) in a symmetrical way with respect to the first vertical plane (PV1). Preferably, the step of disposing in the concrete tower part (3) a plurality of tensioning elements (9) comprises disposing a greater number of strands (14) of the tensioning elements (9) disposed upwards from the first vertical plane (PV1) than the number of strands (14) of the tensioning elements (9) disposed downwards from the first vertical plane (PV1). Preferably, the step of disposing in the concrete tower part (3) a plurality of tensioning elements (9) comprises disposing the first ends (10) and the second ends (11) of the tensioning elements (9) in a symmetrical way with respect to the second vertical plane (PV2).

In another embodiment shown in FIG. 11, the step of exerting a resultant post-tension force (P) comprises a step of exerting a first post-tensioning force (P1) by means of the tensioning elements (9) disposed upwards from the first vertical plane (PV1) and a second post-tensioning force (P2) by means of the tensioning elements (9) disposed downwards from the first vertical plane (PV1), wherein the first post-tensioned force (P1) is greater than the second post-tensioned force (P2).

In the embodiment shown in FIG. 4, the step of disposing in the concrete tower part (3) a plurality of tensioning elements (9) comprises disposing a greater number of second ends (12) of the tensioning elements (9) upwards from the first vertical plane (PV1) than the number of second ends (12) of the tensioning elements (9) disposed downwards from the first vertical plane (PV1).

In the embodiment shown in FIG. 4, the step of exerting a resultant post-tension force (P) is carried out exerting the resultant post-tension force (P) in a line of action contained in a second vertical plane (PV2) perpendicular to the first vertical plane (PV1), the second vertical plane (PV2) containing the predominant wind direction (W).

Optionally, the step of exerting a resultant post-tension force is carried out exerting the resultant post-tension force in a line of action such that the first intersection point (I1) and/or the second intersection point (I2) are located at a distance between 0.1 m and 3 m from the first vertical plane (PV1).

The invention claimed is:

1. A post-tensioning system for a tower of a wind turbine, wherein the tower comprises at least:

a vertical axis;

a concrete tower part comprising:

an upwind side and a downwind side, wherein the upwind side and the downwind side are defined, in use, from a first vertical plane containing the vertical axis and being perpendicular to a predominant wind direction, upwards and downwards respectively, from the first vertical plane; and the system comprising:

an upper end comprising a first surface and a lower end comprising a second surface;

a plurality of tensioning elements, wherein each one of the tensioning elements comprises a first end located in the upper end and a second end located in the lower end;

a first set of anchoring elements configured to anchor the first ends of the tensioning elements towards the first surface;

a second set of anchoring elements configured to anchor the second ends of the tensioning elements towards the second surface;

wherein the tensioning elements are configured to exert a resultant post-tension force comprising a line of action which intersects with a horizontal plane located at the lower end in a first intersection point upwards from the first vertical plane; and wherein the first ends of the tensioning elements are disposed in a symmetrical way with respect to the first vertical plane, while the second ends of the tensioning elements are disposed in a non-symmetrical way with respect to the first vertical plane.

2. The post-tensioning system for a tower of claim 1, wherein the resultant post-tension force also intersects with an additional horizontal plane located at the upper end in a second intersection point.

3. The post-tensioning system of claim 1, wherein the number of second ends of the tensioning elements disposed upwards from the first vertical plane is greater than the number of second ends of the tensioning elements disposed downwards from the first vertical plane.

4. The post-tensioning system of claim 1, wherein each tensioning element comprises a set of strands.

5. The post-tensioning system of claim 1, wherein a first post-tensioning force that exerts, in use, the tensioning elements disposed upwards from the first vertical plane is greater than a second post-tensioning force that exerts, in use, the tensioning elements disposed downwards from the first vertical plane.

6. The post-tensioning system of claim 1, wherein the resultant post-tension force is contained in a second vertical plane perpendicular to the first vertical plane, the second vertical plane containing the predominant wind direction.

7. The post-tensioning system of claim 2, wherein the first ends and the second ends of the tensioning elements are disposed in a symmetrical way with respect to the first vertical plane.

8. A post-tensioning system for a tower of a wind turbine, wherein the tower comprises at least:

a vertical axis;

a concrete tower part comprising:

an upwind side and a downwind side, wherein the upwind side and the downwind side are defined, in use, from a first vertical plane containing the vertical axis and being perpendicular to a predominant wind direction, upwards and downwards respectively, from the first vertical plane; and the system comprising:

an upper end comprising a first surface and a lower end comprising a second surface;

a plurality of tensioning elements, wherein each one of the tensioning elements comprises a first end located in the upper end and a second end located in the lower end;

a first set of anchoring elements configured to anchor the first ends of the tensioning elements towards the first surface;

a second set of anchoring elements configured to anchor the second ends of the tensioning elements towards the second surface;

wherein the tensioning elements are configured to exert a resultant post-tension force comprising a line of action which intersects with a horizontal plane located at the lower end in a first intersection point upwards from the first vertical plane;

wherein the resultant post-tension force also intersects with an additional horizontal plane located at the upper end in a second intersection point; and wherein the first intersection point and the second intersection point are located at the same distance or at a different distance from the first vertical plane.

9. The post-tensioning system of claim 2, wherein the first intersection point and/or the second intersection point are located at a distance between 0.1 m and 3 m from the first vertical plane.

10. A post-tensioned tower of a wind turbine, the tower comprising at least:

a vertical axis;

a concrete tower part comprising:

an upwind side and a downwind side, wherein the upwind side and the downwind side are defined, in use, from a first vertical plane containing the vertical axis and being perpendicular to a predominant wind direction, upwards and downwards respectively, from the first vertical plane; and a post-tensioning system for a tower of a wind turbine comprising:

an upper end comprising a first surface and a lower end-comprising a second surface;

a plurality of tensioning elements, wherein each one of the tensioning elements comprises a first end located in the upper end and a second end located in the lower end;

a first set of anchoring elements configured to anchor the first ends of the tensioning elements towards the first surface;

a second set of anchoring elements configured to anchor the second ends of the tensioning elements towards the second surface;

wherein the tensioning elements are configured to exert a resultant post-tension force comprising a line of action which intersects with a horizontal plane located at the lower end in a first intersection point upwards from the first vertical plane;

wherein the plurality of tensioning elements comprises at least one tensioning element disposed in the downwind side of the concrete tower part with fewer strands than at least one tensioning element disposed in the upwind side of the concrete tower part or in that the plurality of tensioning elements comprises more tensioning elements disposed in the upwind side of the concrete tower part than in the downwind side of the concrete tower part.

11. A wind turbine comprising the post-tensioned tower of claim 10.

12. A method of post-tensioning a tower of a wind turbine, wherein the tower comprises at least:

a vertical axis;

a concrete tower part comprising:

an upwind side and a downwind side, wherein the upwind side and the downwind side are defined, in use, from a first vertical plane containing the vertical axis and being perpendicular to a predominant wind direction, upwards and downwards respectively, from the first vertical plane; and the method carried out with the post-tensioning system of claim 1 and comprising:

a step of disposing in the concrete tower part a plurality of tensioning elements, wherein each one of the tensioning elements comprises a first end located in the upper end and a second end located in the lower end;

a step of anchoring a first set of anchoring elements in the first ends of the tensioning elements towards the first surface;

a step of anchoring a second set of anchoring elements in the second ends of the tensioning elements towards the second surface; and a step of exerting a resultant post-tension force comprising a line of action which intersects with a horizontal plane located at the lower end in a first intersection point upwards from the first vertical plane, wherein the resultant post-tension force is exerted by the tensioning elements;

wherein the step of disposing in the concrete tower part a plurality of tensioning elements, wherein each one of the tensioning elements comprises a first end located in the upper end and a second end located in the lower end, comprises a step of disposing at least one tensioning element with fewer strands in the downwind side than in the upwind side or comprises a step of disposing more tensioning elements in the upwind side than in the downwind side.

13. The method of claim 12, wherein the step of exerting a resultant post-tension force comprising a line of action which intersects with a horizontal plane located at the lower end in a first intersection point upwards from the first vertical plane comprises a step of exerting a first post-tensioning force by the tensioning elements disposed upwards from the first vertical plane and a second post-tensioning force by the tensioning elements disposed downwards from the first vertical plane, wherein the first post-tensioning force is greater than the second post-tensioning force.

* * * * *